United States Patent

Wu

(10) Patent No.: US 8,358,106 B2
(45) Date of Patent: Jan. 22, 2013

(54) AC AND DC DUAL INPUT CHARGER

(75) Inventor: Jui-Hsiung Wu, Taipei (TW)

(73) Assignee: Well Shin Technology Co., Ltd., Taipei (TW)

( * ) Notice: Subject to any disclaimer, the term of this patent is extended or adjusted under 35 U.S.C. 154(b) by 479 days.

(21) Appl. No.: 12/714,372

(22) Filed: Feb. 26, 2010

(65) Prior Publication Data

US 2011/0210699 A1 Sep. 1, 2011

(51) Int. Cl.
 *H02J 7/02* (2006.01)
(52) U.S. Cl. .................................. 320/111; 320/107
(58) Field of Classification Search .................. None
 See application file for complete search history.

(56) References Cited

U.S. PATENT DOCUMENTS

| | | | | |
|---|---|---|---|---|
| 5,122,721 A | * | 6/1992 | Okada et al. | 320/111 |
| 5,744,934 A | * | 4/1998 | Wu | 320/111 |
| 2009/0117765 A1 | * | 5/2009 | Wen et al. | 439/166 |

* cited by examiner

*Primary Examiner* — Drew A Dunn
*Assistant Examiner* — Robert Grant
(74) *Attorney, Agent, or Firm* — Lin & Associates IP, Inc.

(57) ABSTRACT

An AC and DC dual input charger includes a charger receptacle and a plug connector assembly. The charger receptacle includes a cover, a printed circuit board assembly, at least two AC input components, at least two DC input components and an output member. The cover defines an accommodating chamber and a receiving cavity. The printed circuit board assembly is received in the accommodating chamber and defines an AC charging circuit and a DC charging circuit. The AC input components and the DC input components are mounted to the charger receptacle and electrically connected with the AC charging circuit and the DC charging circuit, respectively. The output member is mounted on the printed circuit board assembly. The plug connector assembly includes an AC plug and a DC plug which can be alternately inserted in the receiving cavity so as to provide corresponding AC and DC charging power for the charger receptacle.

12 Claims, 6 Drawing Sheets

AC AND DC DUAL INPUT CHARGER

BACKGROUND OF THE INVENTION

1. Field of the Invention

The present invention generally relates to a charger, and more particularly to an AC and DC dual input charger.

2. The Related Art

A conventional charger is generally an AC power charger or a DC power charger. The AC power charger is directly connected with the AC power, and is mainly used inside a room. The DC power charger is connected with the DC power through a car charger, and is mainly used in a car and other vehicles. In order to make the charger used in both AC and DC work modes, an AC input plug and a DC input plug are provided to connect with the charger, and a manual control switch is mounted to the charger so as to switch the AC and DC input. However, when the AC and DC dual input charger described above is in use, it needs to control the switch manually to match the AC plug or DC plug so as to realize the function of charging. As a result, the usage of the AC and DC dual input charger becomes complex and apt to cause a wrong operation.

SUMMARY OF THE INVENTION

An object of the present invention is to provide an AC and DC dual input charger, the AC and DC dual input charger includes a charger receptacle and a plug connector assembly. The charger receptacle includes a cover, a printed circuit board assembly, at least two AC input components, at least two DC input components and an output member. The cover is mated with a base to define an accommodating chamber therebetween, the cover further defines a receiving cavity with a front and a top freely opened, the receiving cavity and the accommodating chamber are separated from each other by a separating wall therebetween. The printed circuit board assembly is received in the accommodating chamber and defines an AC charging circuit and a DC charging circuit. The AC input components each have a connecting slice, an inserting pillar fastened on the connecting slice and a soldering arm extended from a bottom end of the connecting slice, the connecting slice is mounted in the separating wall of the cover and the inserting pillar passes through the separating wall to stretch into the receiving cavity, the soldering arm is inserted in the printed circuit board assembly to be electrically connected with the AC charging circuit. The DC input components each have a fastening portion fastened under the bottom base of the receiving cavity, a side of the fastening portion is bent to form a soldering portion inserted in the printed circuit board assembly to be electrically connected with the DC charging circuit, an end of the fastening portion is arched oppositely to the soldering portion to form a contact portion passing through the bottom base to elastically stretch into the receiving cavity. The output member is mounted on the printed circuit board assembly and exposed out of the cover. The plug connector assembly includes an AC plug and a DC plug, wherein the AC plug and the DC plug can be alternately inserted in the receiving cavity of the charger receptacle, the AC plug can be electrically connected with the inserting pillars of the AC input components to provide an AC charging power, and the DC plug can be electrically connected with the contact portions of the DC input components to provide a DC charging power.

As described above, when the AC and DC dual input charger is in use, only the AC plug or the DC plug will be chosen to be engaged with the charger receptacle because the charger receptacle is designed with the DC and AC input components therein, and the AC and DC plugs are accordingly designed with the avoiding channels and holes. So it needn't to set up a manual control switch to match the AC input plug or the DC input plug of the prior art, and the wrong operation can be avoided.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
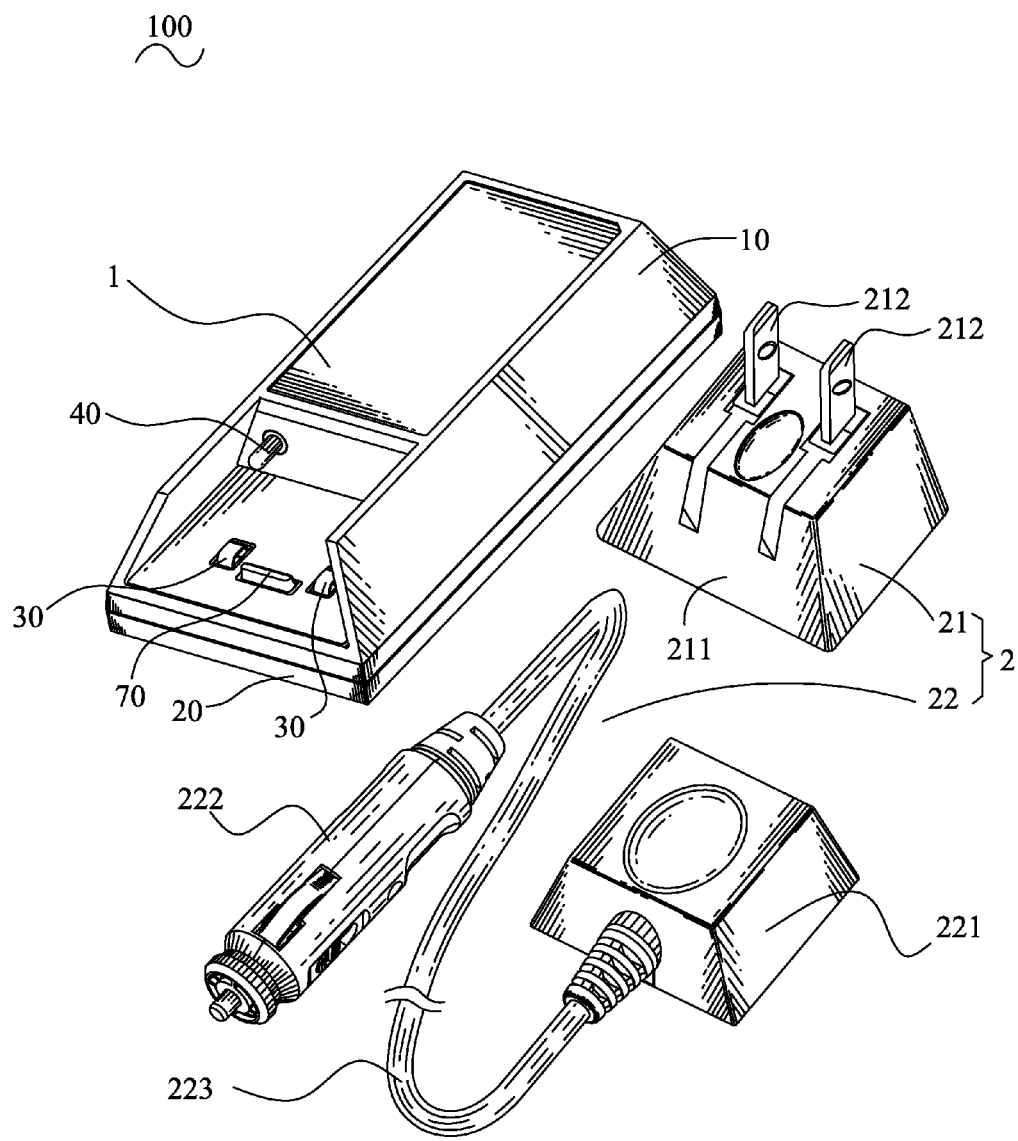
FIG. 1 is a perspective view of an AC and DC dual input charger in accordance with the present invention.

With reference to FIG. 1, an AC and DC dual input charger 100 according to the present invention includes a charger receptacle 1 and a plug connector assembly 2. The plug connector assembly 2 includes an AC plug 21 and a DC plug 22.

Figure 2:
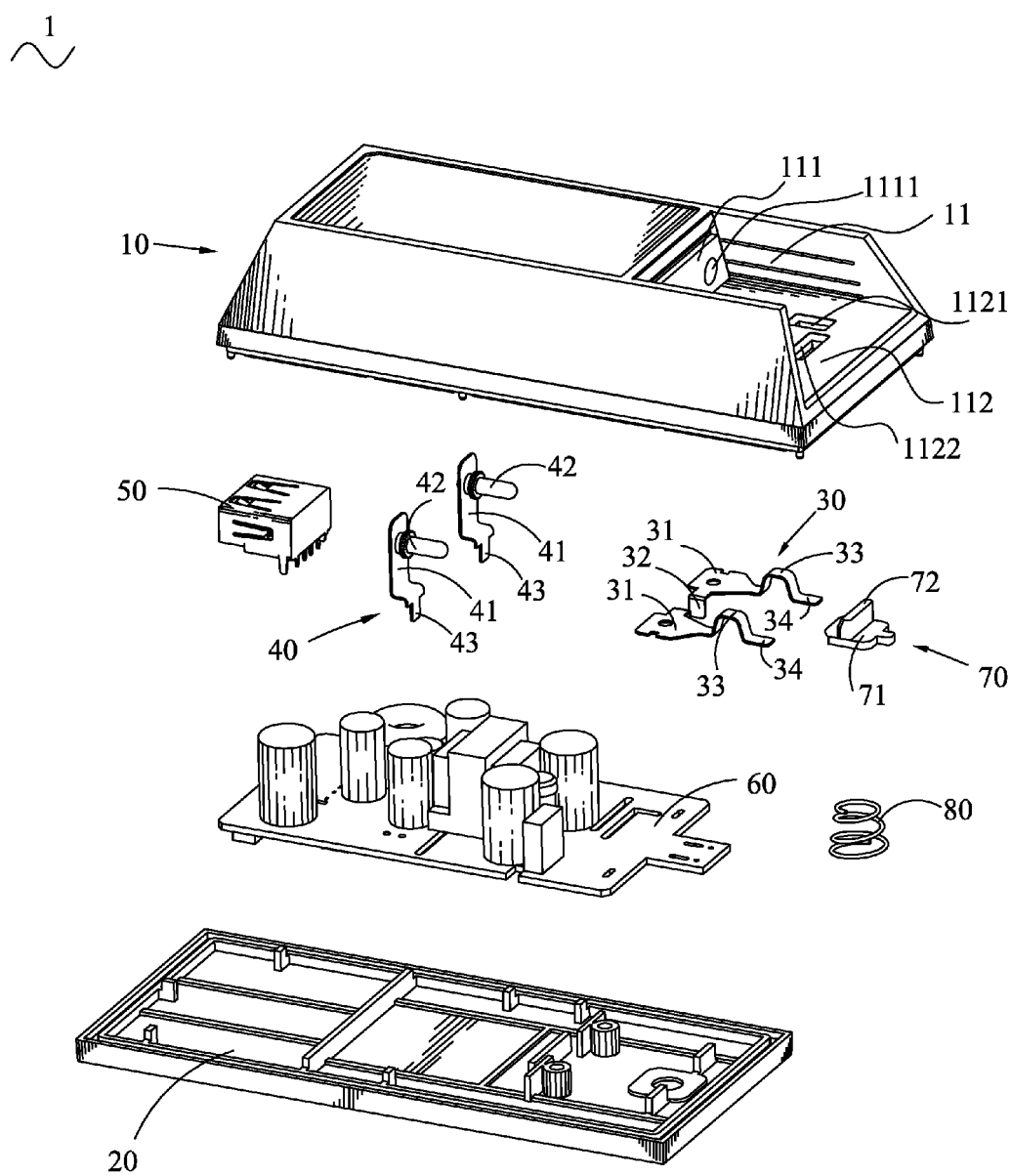
FIG. 2 is an exploded view of a charger receptacle of the AC and DC dual input charger of FIG. 1.

Referring to FIG. 2, the charger receptacle 1 includes a cover 10, a base 20, a DC input component assembly, an AC input component assembly, an output member 50, a printed circuit board assembly 60, a lock 70 and a spring 80.

Figure 3:
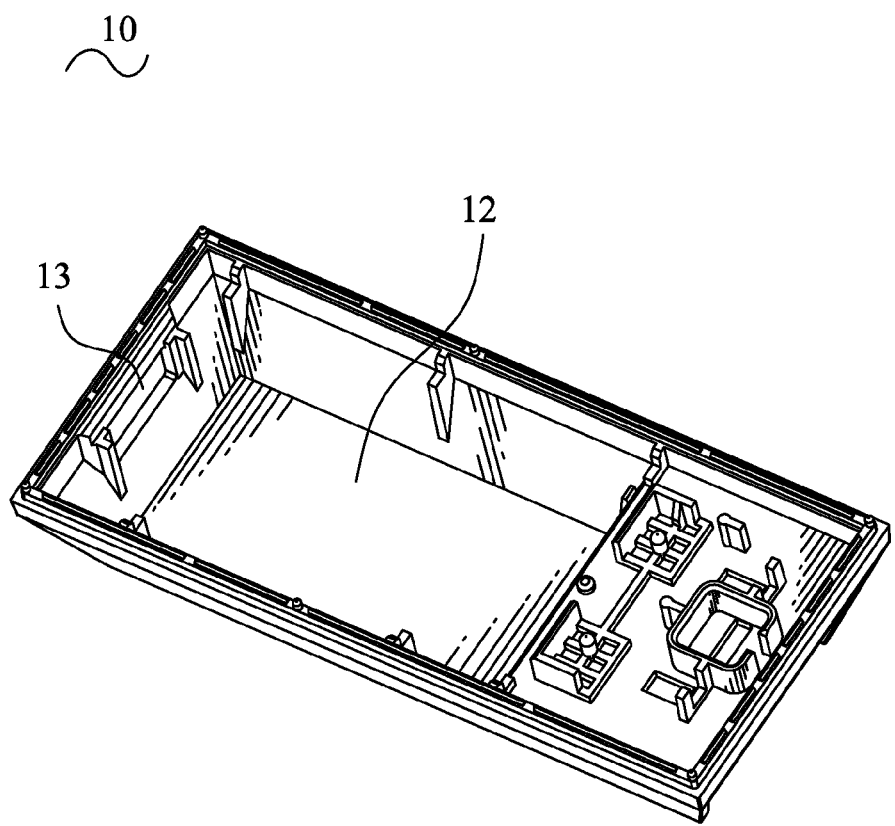
FIG. 3 is a perspective view of a cover of the charger receptacle of FIG. 2.

Referring to FIG. 2 and FIG. 3, the cover 10 is of a trapezoid configuration. The cover 10 defines a receiving cavity 11 at a front portion thereof with a front and top being freely opened, and an accommodating chamber 12 at a rear portion thereof with a bottom being freely opened. Accordingly, a separating wall 111 is formed between the receiving cavity 11 and the accommodating chamber 12. The separating wall 111 defines two inserting holes 1111 longitudinally penetrating therethrough to communicate with the receiving cavity 11 and the accommodating chamber 12. The two inserting holes 1111 are transversely arranged and spaced from each other. A bottom base 112 of the receiving cavity 11 defines two parallel inserting passages 1121 extending longitudinally and spaced from each other, and an inserting fillister 1122 extending transversely between the two inserting passages 1121. Each of the inserting passages 1121 and the inserting fillister 1122 vertically penetrate through the bottom base 112. A rear wall of the accommodating chamber 12 defines an inserting window 13 penetrating therethrough to communicate with the accommodating chamber 12 and the outside of the cover 10.

Referring to FIG. 2 again, the DC input component assembly includes two DC input components 30. The DC input component 30 has a board-shaped fastening portion 31. A side of the fastening portion 31 extends along a direction perpendicular to the fastening portion 31 to form a soldering portion 32. An end of the fastening portion 31 further extends and then is arched oppositely to the soldering portion 32 to form a contact portion 33 with a trapezoid configuration. A free end of the contact portion 33 extends oppositely to the fastening portion 31 to form a blocking portion 34.

Referring to FIG. 2 again, the AC input component assembly includes two AC input components 40. The AC input component 40 has a connecting slice 41 and an inserting pillar 42 perpendicularly connected with the connecting slice 41. One end of the connecting slice 41 is bent towards a same direction as the inserting pillar 42, and then extends oppositely to the connecting slice 41 to form a soldering arm 43. The printed circuit board assembly 60 defines an AC charging circuit (not shown) and a DC charging circuit (not shown).

Figure 4:
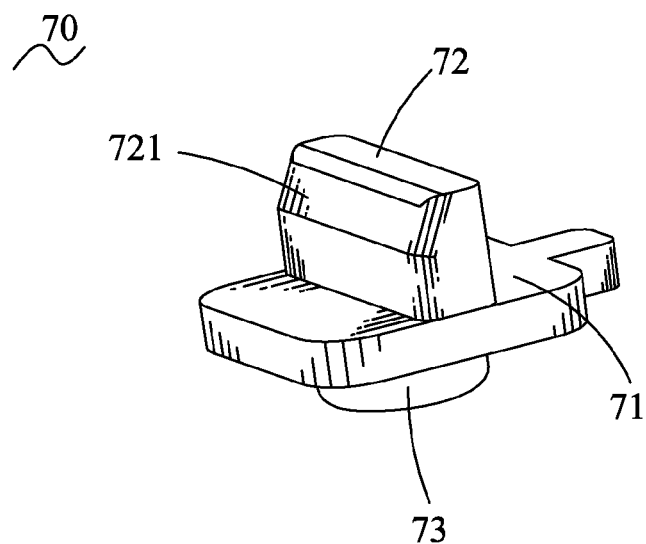
FIG. 4 is a perspective view of a lock of the charger receptacle of FIG. 2.

Referring to FIG. 2 and FIG. 4, the lock 70 has a fastening board 71, a substantially rectangular protrusion 72 and a propping portion 73 which are oppositely protruded from a substantial middle of two opposite surfaces of the fastening board 71. One side edge of a free end of the protrusion 72 is cut off along a longwise direction thereof to form a smooth incline 721.

Referring to FIG. 1 and FIG. 2, when the charger receptacle 1 is assembled, the printed circuit board assembly 60 is mounted on the base 20 and the cover 10 is covered on the base 20 to make a rear of the printed circuit board assembly 60 received in the accommodating chamber 12 and a front of the printed circuit board assembly 60 located under the bottom base 112 of the receiving cavity 11. The fastening portion 31 of each DC input component 30 is fastened under the bottom base 112 and the blocking portion 34 abuts under the bottom base 112 to make the contact portion 33 pass through the corresponding inserting passage 1121 to elastically stretch into the receiving cavity 11. The soldering portion 32 is inserted in the front of the printed circuit board assembly 60 and electrically connected with the DC charging circuit. The connecting slice 41 of each AC input component 40 is fastened to the separating wall 111, the inserting pillar 42 passes through the corresponding inserting hole 1111 to stretch into the receiving cavity 11, and the soldering arm 43 is inserted in the front of the printed circuit board assembly 60 to be electrically connected with the AC charging circuit. The output member 50 is mounted on the rear of the printed circuit board assembly 60 and a rear end thereof is exposed to the outside of the cover 10 through the inserting window 13. The fastening board 71 of the lock 70 is mounted under the bottom base 112, the protrusion 72 passes through the inserting fillister 1122 to stretch into the receiving cavity 11, and the propping portion 73 is inserted in a front of the base 20. The spring 80 is sleeved around the propping portion 73 and elastically clipped between the bottom base 112 and the base 20 so that the lock 70 can move through the inserting fillister 1122 up and down.

Figure 5:
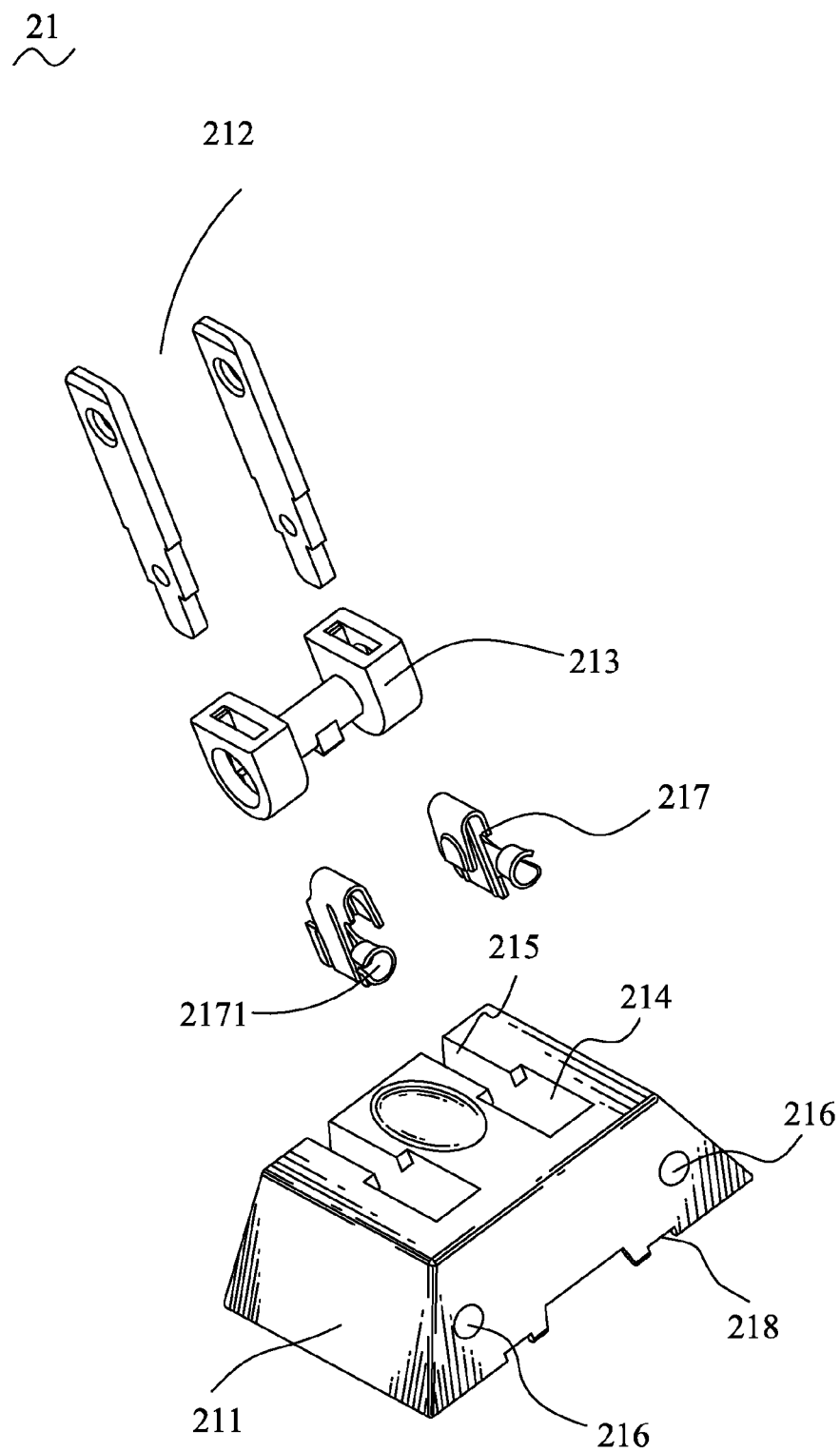
FIG. 5 is an exploded view of an AC plug of the AC and DC dual input charger of FIG. 1.
Figure 6:
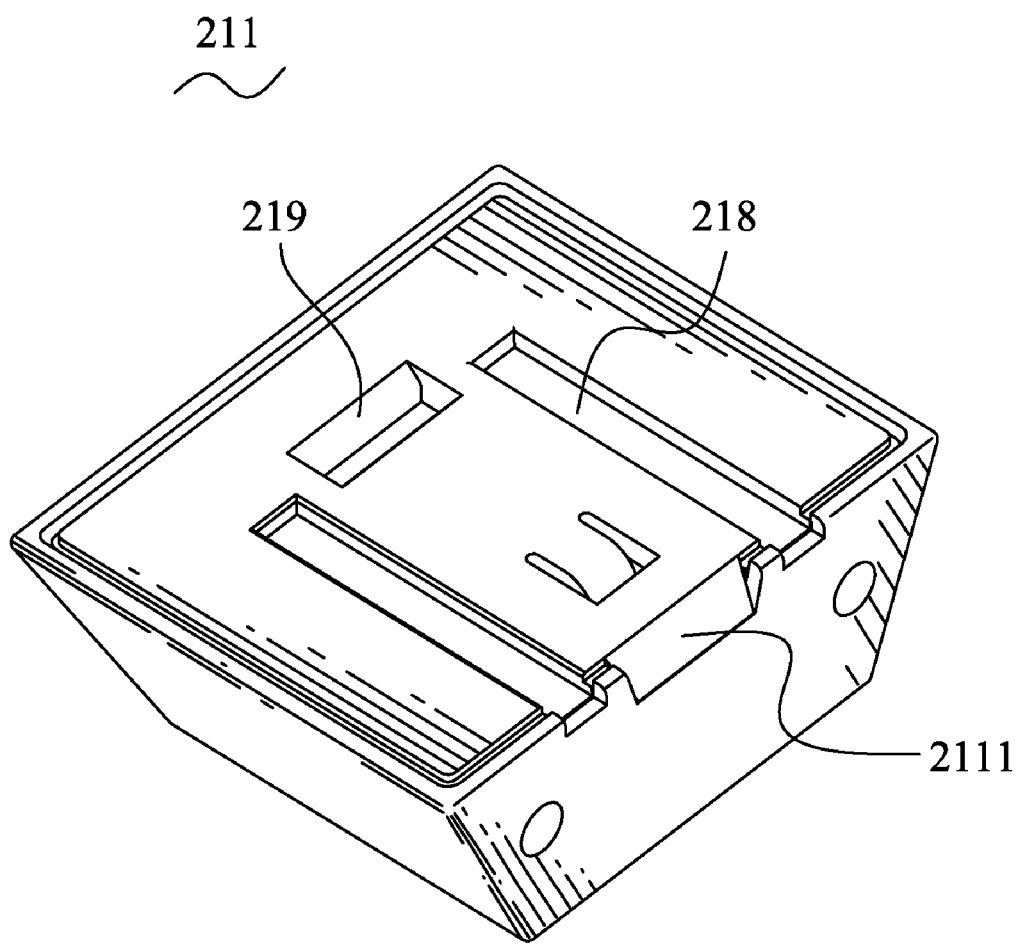
FIG. 6 is a perspective view of a plug housing of the AC plug of FIG. 5.

Referring to FIG. 5 and FIG. 6, the AC plug 21 includes a plug housing 211 with a trapezoid configuration, two electrode pins 212, a rotating axle 213 and two electrode terminals 217. Two sides of a top of the plug housing 211 define two receiving grooves 214 transversely arranged and spaced from each other, and two receiving channels 215 each longitudinally extending with one end thereof being connected with the corresponding receiving groove 214 and the other end thereof passing through a front of the plug housing 211. A rear of the plug housing 211 defines two inserting apertures 216 transversely spaced from each other and each extending longitudinally. A bottom of the plug housing 211 defines two avoiding channels 218 spaced from each other to have an equal interval therebetween to the one between the two inserting passages 1121 of the cover 10 and each extending longitudinally to penetrate through the rear of the plug housing 211, and a locking groove 219 transversely opened between the two avoiding channels 218. A middle of a bottom edge of the rear of the plug housing 211 is provided with an inclined first guiding surface 2111. The electrode terminals 217 are mounted in the plug housing 211 and each defines an electrode hole 2171 connected with the corresponding inserting aperture 216. Two opposite ends of the rotating axle 213 are respectively pivoted in the corresponding receiving grooves 214, and two ends of the two electrode pins 212 are respectively fastened in the two opposite ends of the rotating axle 213 so that the electrode pins 212 can be folded into or drawn out from the respective receiving channels 215 around the rotating axle 213.

Figure 7:
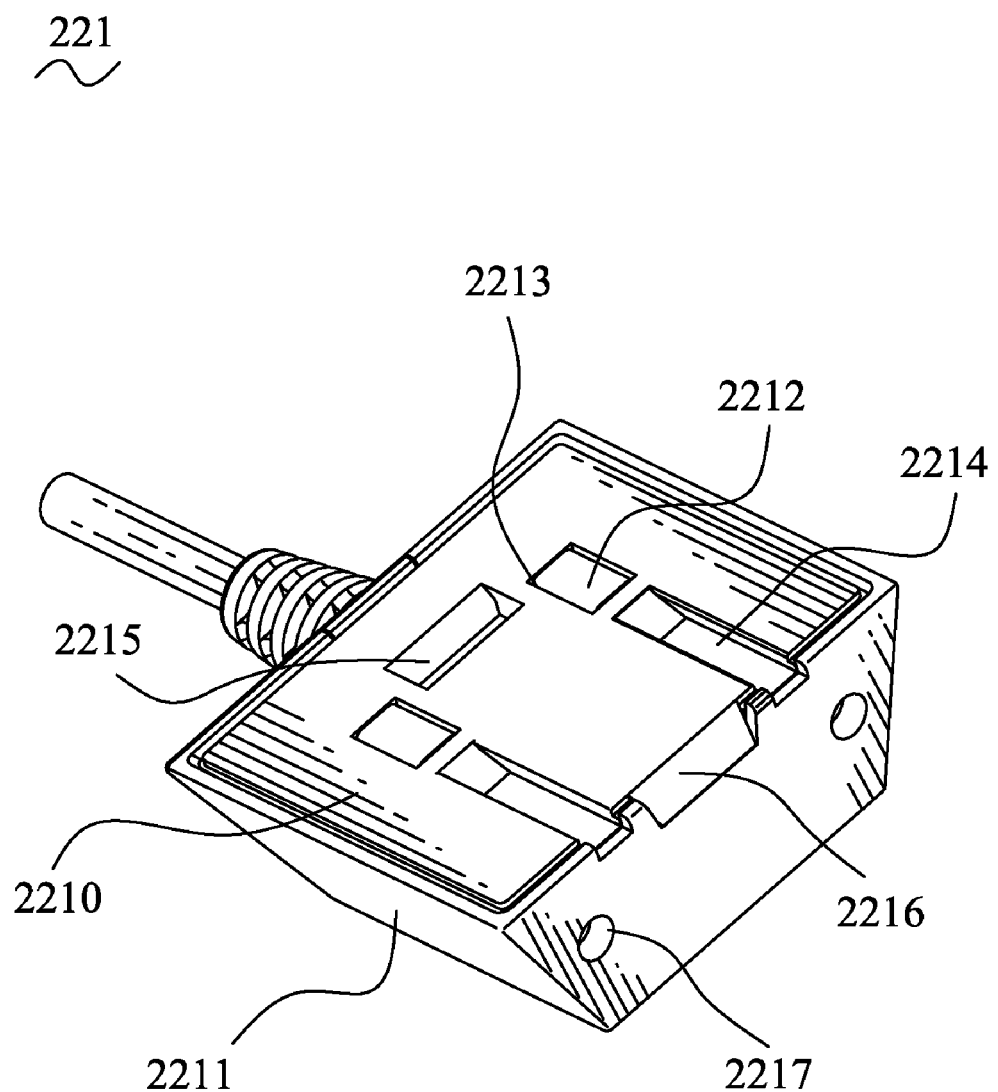
FIG. 7 is a perspective view of a connecting part of a DC plug of the AC and DC dual input charger of FIG. 1.

Referring to FIG. 1 and FIG. 7, the DC plug 22 includes a connecting part 221, a car charging head 222 and a power wire 223 used to connect the connecting part 221 and the car charging head 222. The connecting part 221 includes a trapezoid plug body 2211 and two contact slices 2212 mounted in the plug body 2211. A bottom surface 2210 of the plug body 2211 defines two receiving fillisters 2213 which are transversely spaced from each other to have an equal interval therebetween to the one between the two inserting passages 1121 of the cover 10, and two guiding grooves 2214 of which each is longitudinally aligned with one receiving fillister 2213 with one end thereof penetrating through a rear of the plug body 2211. The contact slices 2212 are exposed to the bottom surface 2210 of the plug body 2211 through the respective receiving fillisters 2213. The bottom surface 2210 of the plug body 2211 further defines a locking pit 2215 opened between the two receiving fillisters 2213. A middle of a bottom edge of the rear of the plug body 2211 is provided with an inclined second guiding surface 2216. The rear of the plug body 2211 further defines two avoiding holes 2217 transversely spaced from each other and each extending longitudinally.

Referring to FIG. 1, FIG. 2, FIG. 5 and FIG. 6, in use, the AC plug 21 and the connecting part 221 of the DC plug 22 can be respectively inserted in the receiving cavity 11 of the charger receptacle 1 so as to provide the corresponding AC and DC charging power for the charger receptacle 1. When the AC plug 21 is assembled to the receiving cavity 11 of the charger receptacle 1, the contact portions 33 of the DC input components 30 are received in the respective avoiding channels 218 of the plug housing 211, the protrusion 72 of the lock 70 is pressed into the inserting fillister 1122 by the first guiding surface 2111 of the plug housing 211 until the AC plug 21 is fully engaged in the receiving cavity 11, then the protrusion 72 is bounced into the locking groove 219 of the plug housing 211 under the elasticity of the spring 80 so as to firmly buckle the AC plug 21 in the receiving cavity 11. The inserting pillars 42 of the AC input components 40 are inserted into the corresponding inserting apertures 216 of the plug housing 211 and the corresponding electrode holes 2171 to electrically contact with the corresponding electrode terminals 217. When the AC plug 21 is pulled out from the receiving cavity 11, a sidewall of the locking groove 219 can slide along the incline 721 of the lock 70 to press down the protrusion 72 of the lock 70 so as to conveniently pull out the AC plug 21.

Referring to FIG. 1, FIG. 2 and FIG. 7, when the DC plug 22 is assembled to the receiving cavity 11 of the charger receptacle 1, the protrusion 72 of the lock 70 is pressed into the inserting fillister 1122 by the second guiding surface 2216 of the connecting part 221 until the connecting part 221 is fully engaged in the receiving cavity 11, then the protrusion 72 is bounced into the locking pit 2215 of the plug body 2211 under the elasticity of the spring 80 so as to firmly buckle the connecting part 221 in the receiving cavity 11. At this time, the inserting pillars 42 of the AC input components 40 are inserted in the corresponding avoiding holes 2217. During the connecting part 221 is inserted into the receiving cavity 11, the contact portions 33 of the DC input components 30 slide along the respective guiding grooves 2214 of the plug body 2211 until being electrically contacted with the corresponding contact slices 2212. When the connecting part 221 of the DC plug 22 is pulled out from the receiving cavity 11, a sidewall of the locking pit 2215 of the connecting part 221 can slide along the incline 721 of the lock 70 to press down the protrusion 72 of the lock 70 so as to conveniently pull out the connecting part 221.

As described above, when the AC and DC dual input charger 100 is in use, only the AC plug 21 or the DC plug 22 will be chosen to be engaged with the charger receptacle 1 because the charger receptacle 1 is designed with the DC and AC input components 30, 40 therein, and the AC and DC plugs 21, 22 are accordingly designed with the avoiding channels and holes 218, 2217. So it needn't to set up a manual control switch to match the AC input plug or the DC input plug of the prior art, and the wrong operation can be avoided.

What is claimed is:

1. An AC and DC dual input charger, comprising:
   a charger receptacle having:
      a cover mated with a base to define an accommodating chamber therebetween, the cover further defining a receiving cavity with a front and a top being freely opened, the receiving cavity and the accommodating chamber being separated from each other by a separating wall therebetween,
      a printed circuit board assembly received in the accommodating chamber and defining an AC charging circuit and a DC charging circuit,
      at least two AC input components each having a connecting slice, an inserting pillar fastened on the connecting slice and a soldering arm extended from a bottom end of the connecting slice, the connecting slice being mounted in the separating wall of the cover and the inserting pillar passing through the separating wall to stretch into the receiving cavity, the soldering arm being inserted in the printed circuit board assembly to be electrically connected with the AC charging circuit,
      at least two DC input components each having a fastening portion fastened under the bottom base of the receiving cavity, a side of the fastening portion being bent to form a soldering portion inserted in the printed circuit board assembly to be electrically connected with the DC charging circuit, an end of the fastening portion being arched oppositely to the soldering portion to form a contact portion passing through the bottom base to elastically stretch into the receiving cavity, and an output member mounted on the printed circuit board assembly and exposed out of the cover; and
   a plug connector assembly having an AC plug and a DC plug, wherein the AC plug and the DC plug can be alternately inserted in the receiving cavity of the charger receptacle, the AC plug can be electrically connected with the inserting pillars of the AC input components to provide an AC charging power, and the DC plug can be electrically connected with the contact portions of the DC input components to provide a DC charging power;
   wherein the DC plug includes a connecting part capable of being received in the receiving cavity of the cover, the connecting part includes a plug body and two contact slices which are mounted in the plug body and exposed to a bottom surface of the plug body so as to electrically contact the corresponding contact portions of the DC input components, a rear of the plug body defines two avoiding holes spaced from each other for receiving the corresponding inserting pillars of the AC input components therein.

2. The AC and DC dual input charger as claimed in claim 1, wherein a free end of the contact portion of each DC input component further extends oppositely to the fastening portion to form a blocking portion abutting under the bottom base of the receiving cavity of the cover.

3. The AC and DC dual input charger as claimed in claim 1, wherein a rear wall of the accommodating chamber defines an inserting window penetrating therethrough to communicate with the accommodating chamber and the outside of the cover, the output member is exposed to the outside of the cover through the inserting window.

4. The AC and DC dual input charger as claimed in claim 1, wherein the bottom base of the receiving cavity defines two longitudinal inserting passages vertically penetrating therethrough and spaced from each other, the contact portions of the DC input components pass through the corresponding inserting passages to stretch into the receiving cavity.

5. The AC and DC dual input charger as claimed in claim 4, wherein the bottom base of the receiving cavity further defines an inserting fillister extending transversely between the two inserting passages and vertically penetrating therethrough, the charger receptacle further includes a spring and a lock which has a fastening board, a protrusion and a propping portion oppositely protruded from two opposite surfaces of the fastening board, the fastening board is mounted under the bottom base of the receiving cavity of the cover, the protrusion passes through the inserting fillister to stretch into the receiving cavity, the spring is sleeved around the propping portion and elastically clipped between the bottom base and the base so as to make the lock movable through the inserting fillister up and down and further drive the protrusion to be inserted in and fallen off the plug connector assembly.

6. The AC and DC dual input charger as claimed in claim 5, wherein one side edge of a top end of the protrusion is cut off along a longwise direction thereof to form a smooth incline for guiding the plug connector assembly to be inserted into and drawn out of the receiving cavity of the cover.

7. An AC and DC dual input charger, comprising:
   a charger receptacle having:
      a cover mated with a base to define an accommodating chamber therebetween, the cover further defining a receiving cavity with a front and a top being freely opened, the receiving cavity and the accommodating chamber being separated from each other by a separating wall therebetween,
      a printed circuit board assembly received in the accommodating chamber and defining an AC charging circuit and a DC charging circuit,
      at least two AC input components each having a connecting slice, an inserting pillar fastened on the connecting slice and a soldering arm extended from a bottom end of the connecting slice, the connecting slice being mounted in the separating wall of the cover and the inserting pillar passing through the separating wall to stretch into the receiving cavity, the soldering arm being inserted in the printed circuit board assembly to be electrically connected with the AC charging circuit,
      at least two DC input components each having a fastening portion fastened under the bottom base of the receiving cavity, a side of the fastening portion being bent to form a soldering portion inserted in the printed circuit board assembly to be electrically connected with the DC charging circuit, an end of the fastening portion being arched oppositely to the soldering portion to form a contact portion passing through the bottom base to elastically stretch into the receiving cavity, and an output member mounted on the printed circuit board assembly and exposed out of the cover; and a plug connector assembly having an AC plug and a DC plug, wherein the AC plug and the DC plug can be alternately inserted in the receiving cavity of the charger receptacle, the AC plug can be electrically connected with the inserting pillars of the AC input components to provide an AC charging power, and the DC plug can be electrically connected with the contact portions of the DC input components to provide a DC charging power;

wherein the AC plug includes a plug housing and two electrode terminals which are assembled in the plug housing and respectively define an electrode hole, a rear of the plug housing defines two inserting apertures spaced from each other and each connected with the electrode hole of the corresponding electrode terminal, a bottom of the plug housing defines two avoiding channels spaced from each other for receiving the corresponding contact portions of the DC input components therein, the inserting pillars of the AC input components are successively inserted into the corresponding inserting apertures of the plug housing and the corresponding electrode holes of the electrode terminals so as to electrically connect with the corresponding electrode terminals.

8. The AC and DC dual input charger as claimed in claim 7, wherein a free end of the contact portion of each DC input component further extends oppositely to the fastening portion to form a blocking portion abutting under the bottom base of the receiving cavity of the cover.

9. The AC and DC dual input charger as claimed in claim 7, wherein a rear wall of the accommodating chamber defines an inserting window penetrating therethrough to communicate with the accommodating chamber and the outside of the cover, the output member is exposed to the outside of the cover through the inserting window.

10. The AC and DC dual input charger as claimed in claim 7, wherein the bottom base of the receiving cavity defines two longitudinal inserting passages vertically penetrating therethrough and spaced from each other, the contact portions of the DC input components pass through the corresponding inserting passages to stretch into the receiving cavity.

11. The AC and DC dual input charger as claimed in claim 10, wherein the bottom base of the receiving cavity further defines an inserting fillister extending transversely between the two inserting passages and vertically penetrating therethrough, the charger receptacle further includes a spring and a lock which has a fastening board, a protrusion and a propping portion oppositely protruded from two opposite surfaces of the fastening board, the fastening board is mounted under the bottom base of the receiving cavity of the cover, the protrusion passes through the inserting fillister to stretch into the receiving cavity, the spring is sleeved around the propping portion and elastically clipped between the bottom base and the base so as to make the lock movable through the inserting fillister up and down and further drive the protrusion to be inserted in and fallen off the plug connector assembly.

12. The AC and DC dual input charger as claimed in claim 11, wherein one side edge of a top end of the protrusion is cut off along a longwise direction thereof to form a smooth incline for guiding the plug connector assembly to be inserted into and drawn out of the receiving cavity of the cover.

* * * * *